United States Patent [19]

Nakatsuka et al.

[11] Patent Number: 4,926,254

[45] Date of Patent: May 15, 1990

[54] METHOD OF CORRECTING COLOR IMAGE DATA FOR OBTAINING PROOF IMAGE

[75] Inventors: Kimihiro Nakatsuka; Fumihiro Hatayama, both of Kyoto, Japan

[73] Assignee: Dainippon Screen Mfg. Co., Ltd., Japan

[21] Appl. No.: 247,901

[22] Filed: Sep. 22, 1988

[30] Foreign Application Priority Data

Sep. 22, 1987 [JP] Japan .................. 62-238058

[51] Int. Cl.$^5$ .............................................. H04N 1/46
[52] U.S. Cl. ............................................. 358/76; 358/80
[58] Field of Search .............................. 358/75, 76, 80

[56] References Cited

U.S. PATENT DOCUMENTS

| | | |
|---|---|---|
| 4,454,536 | 6/1984 | Shimura et al. .......... 358/76 |
| 4,468,692 | 8/1984 | Yamada et al. .......... 358/76 |
| 4,561,016 | 12/1985 | Jung et al. .......... 358/76 |
| 4,573,071 | 2/1986 | Sakamoto .......... 358/76 |
| 4,639,770 | 1/1987 | Jung et al. .......... 358/76 |

*Primary Examiner*—Howard W. Britton
*Assistant Examiner*—Mark R. Powell
*Attorney, Agent, or Firm*—Ostrolenk, Faber, Gerb & Soffen

[57] ABSTRACT

Printable color image data (Y, M, C and K) is subjected, in a first processor ($S_1$), to a first correction procedure to compensate the same for a first additivity failure which results from the mixing of primary chromatic components (Y, M, and C). The color image data is thereafter subjected, in a second processor ($S_2$), to a second correction procedure involving compensation for a second additivity failure caused by mixture of primary chromatic components (Y, M and C) with an achromatic component (K). Thereby, color image data ($Y_5$, $M_5$ and $C_5$) is obtained from which a color film approximating the colors that will appear in an ink-based printed reproduction of an original image is obtained. Conversion functions for providing the necessary compensation for the two additivity failures are defined/obtained on the basis of actual densities of a printed version of the color image data and a color film version thereof.

11 Claims, 14 Drawing Sheets

No.1 (OP₁)

No.2 (OP₂)

No.21 (OP₂₁)

No.1 (FR₁)

No.2 (FR₂)

No.21 (FR₂₁)

No.1 (SR₁)

No.2 (SR₂)

No.21 (SR₂₁)

METHOD OF CORRECTING COLOR IMAGE DATA FOR OBTAINING PROOF IMAGE

BACKGROUND OF THE INVENTION

1. Field of the Invention

The present invention relates to a method of correcting color image data, and more particularly, it relates to a method of correcting color image data obtained by a color separation apparatus such as a process color scanner, thereby to obtain a proof image on a display medium such as a color CRT or a color film for previewing a printed image.

2. Description of the Prior Art

In multicolor printing, inks of the four colors yellow (Y), magenta (M) and cyan (C) (i.e., primary chromatic colors), and black (K) (i.e., an achromatic color for mainly compensating gradation of a dark part) are printed over each other to obtain various colors. Thus, the final color tone of a printed matter substantially depends on the ratios and influences the volumes of inked color components Y, M, C and K.

Accordingly, it is important to preadjust the ratios of the color components at desired values, and an apparatus for monitoring a reproduced image having the color components Y, M, C and K on a color CRT or a color film in advance to printing has been developed. In such an apparatus, the respective color components Y, M, C and K supplied from a color scanner are converted into color image data consisting of red (R), green (G) and blue (B), the latter colors comprising the three primary colors of the additive color mixture used in the color CRTs, or into another color image data consisting of Y', M' and C', which are three primary colors of the subtractive color mixture in color film, wherein the achromatic color component K is substantially added to respective primary chromatic color components Y', M' and C' for example.

In this case, a problem is caused due to what is referred to as the "additivity failure" characteristic. FIG. 1 shows a relationship between actual density of a multicolor print and the simple sum of density values of respective single-color prints. The "additivity failure" is such that the density of an actual print obtained by overprinting a plurality of color inks with each other is lower than the simple sum of density values of single-color prints. Such additivity failure characteristic is recognized in printed matter but is not present in a color CRT or a color film. Therefore, when the achromatic color component K is simply added to the respective chromatic color components Y, M and C to reproduce a proof image, the density of the proof image is different from that of an actual printed product.

In order to obtain a proof image which is faithful to the reproduced image through a compensation of the additivity failure, correction methods based on a correlation formula expressing the additivity failure have been developed. One of these is a technique using the well-known Neugebauer's equation.

However, since the additivity failure characteristic is influenced by scattering of light in printing paper or the like, the addivity failure characteristic expressed by the correlation formula does not always coincide with that in actual printing.

Further, since different correlation formulas should be prepared for obtaining proof images corresponding to different printing methods (e.g., gravure printing, offset printing, and those with different screen patterns), respectively, the process for compensating for the additivity failure is complex.

SUMMARY OF THE INVENTION

The present invention concerns a method of correcting color image data to reproduce a proof picture for previewing of a printed matter.

According to the present invention, the method comprises the steps of: (a) preparing a reference color image data, (b) printing a first reproduced image with color inks according to the reference color image data, (c) producing a second reproduced image on the image reproduction means according to the reference color image data, the image reproduction means having a color mixture character different from a color mixture character of the color inks, (d) comparing the first and second reproduced images with each other to find a difference between respective color mixture characters of the color inks and the image reproduction means, (e) finding a correction rule for compensating for the difference, (f) reading an image of an original with a color image reader to obtain first color image data consisting of chromatic and achromatic components, and (g) correcting the first color image data through the correction rule to obtain second color image data consisting of chromatic components to obtain the proof image approximating the printed matter which is reproduced on the basis of the first color image data.

According to an aspect of the present invention, the step (g) includes the steps of: (g-1) correcting the chromatic components of the first color image data into intermediate color image data consisting of chromatic components, thereby to compensate a first additivity failure caused by mixture of chromatic components, and (g-2) combining chromatic components included in the intermediate color image data with the achromatic component included in the first color image data, to obtain the second color image data.

Preferably, the correction rule includes a first additivity failure function for compensating the first additivity failure, and the step (g-1) is conducted through the first additivity failure function.

Further, the difference defined in the step (d) may be found for a plurality of colors in the step (d), and the first additivity failure function may be obtained through an interpolation of the difference for the colors.

According to another aspect of the present invention, the step (g-2) further includes the steps of: (g-2a) converting the chromatic components of the intermediate color image data into a first data consisting of chromatic components through an inverse function of a second additivity failure function, the second additivity failure function being so determined as to compensate a second additivity failure caused by mixture of chromatic components and an achromatic component, (g-2b) converting the achromatic component of the first color image data into a second data consisting of achromatic color component through the inverse function, (g-2c) adding the second data to respective chromatic components of the first data to obtain third data consisting of chromatic components, and (g-2d) converting the third data into the second color image data through the second additivity failure function.

Preferably, the reference color image data may express a color image data expressing an image of a chromatic color scale, and the first additivity failure function is determined through comparison between the first and second reproduced images obtained through the reference color image data.

Further, the reference color image data may be obtained through the step of reading respective colors of color patches with the color image reader, where different colors are provided on the color patches.

According to still another aspect of the present invention, the second additivity failure function is determined through the steps of: (h-1) preparing a reference gray image data having chromatic components and an achromatic component whose combination expresses an image of a gray scale, (h-2) producing chromatic blocks according to the chromatic components of the reference gray image data, (h-3) producing an achromatic block according to the achromatic component of the reference gray image data, (h-4) printing a first gray image with the chromatic blocks or the achromatic block, (h-5) printing a second gray image with the chromatic blocks and the achromatic block, (h-6) comparing respective densities of the first and second gray images to find a relation between the respective densities, and (h-7) finding the second additivity failure function on the basis of the relation found in the step (h-6).

The present invention is further directed to a method of finding a correction rule used to correct an additivity failure caused by a mixture of chromatic components and an achromatic component included in a color image data, where the additivity failure expresses a discrepancy between respective densities of a first reproduced image printed with color inks and a second reproduced image reproduced with an image reproduction means other than color inks both of which are obtained according to the color image data. The method comprises the steps of: (a) preparing a reference gray image data having chromatic components and achromatic component whose combination expresses an image of a gray scale, (b) producing chromatic blocks according to the chromatic components of the reference gray image data, (c) producing an achromatic block according to the achromatic component of the reference gray image data, (d) printing a first gray image with the chromatic blocks or the achromatic block, (e) printing a second gray image with the chromatic blocks and the achromatic block, (f) comparing respective densities of the first and second gray images to find a relation between the respective densities, and (g) finding the correction rule on the basis of the relation found in the step (f).

The inverse function of the second additivity failure function defined in the step (g-2) is made to act upon the respective chromatic components and the achromatic component of the intermediate color image data and thereafter the respective chromatic components are added up with the achromatic component to process the chromatic components after such addition by the second additivity failure function, thereby to obtain a proof image compensating the second additivity failure. The combination of the inverse function and the second additivity failure function ensures invariance in density of the chromatic components when the achromatic component is zero and invariance in density of the achromatic component when the chromatic components is zero.

Accordingly, an object of the present invention is to provide a method of correcting color image data consisting of chromatic and achromatic components through which a proof image approximating a printed matter can be reproduced in high fidelity on a color film, a color CRT or the like.

Another object of the present invention is to easily set correction functions by which the additivity failures are corrected.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
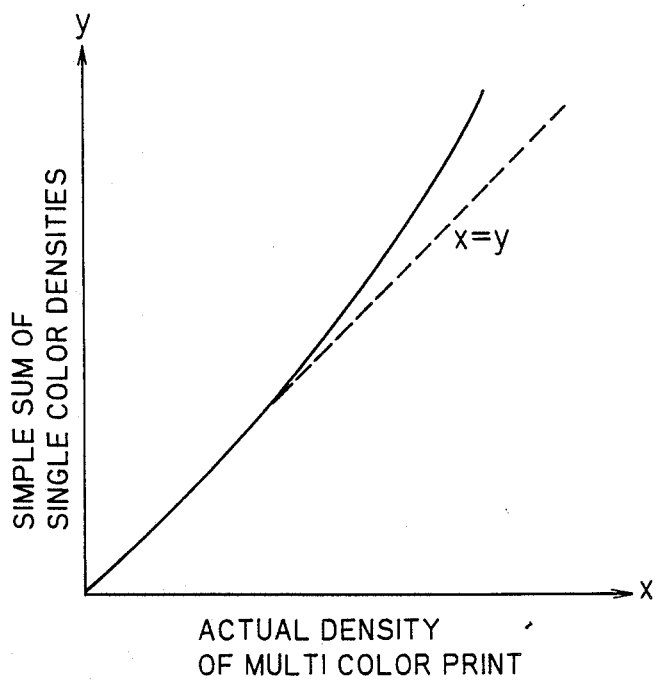
FIG. 1 is a graph showing an additivity failure characteristic.
Figure 2:
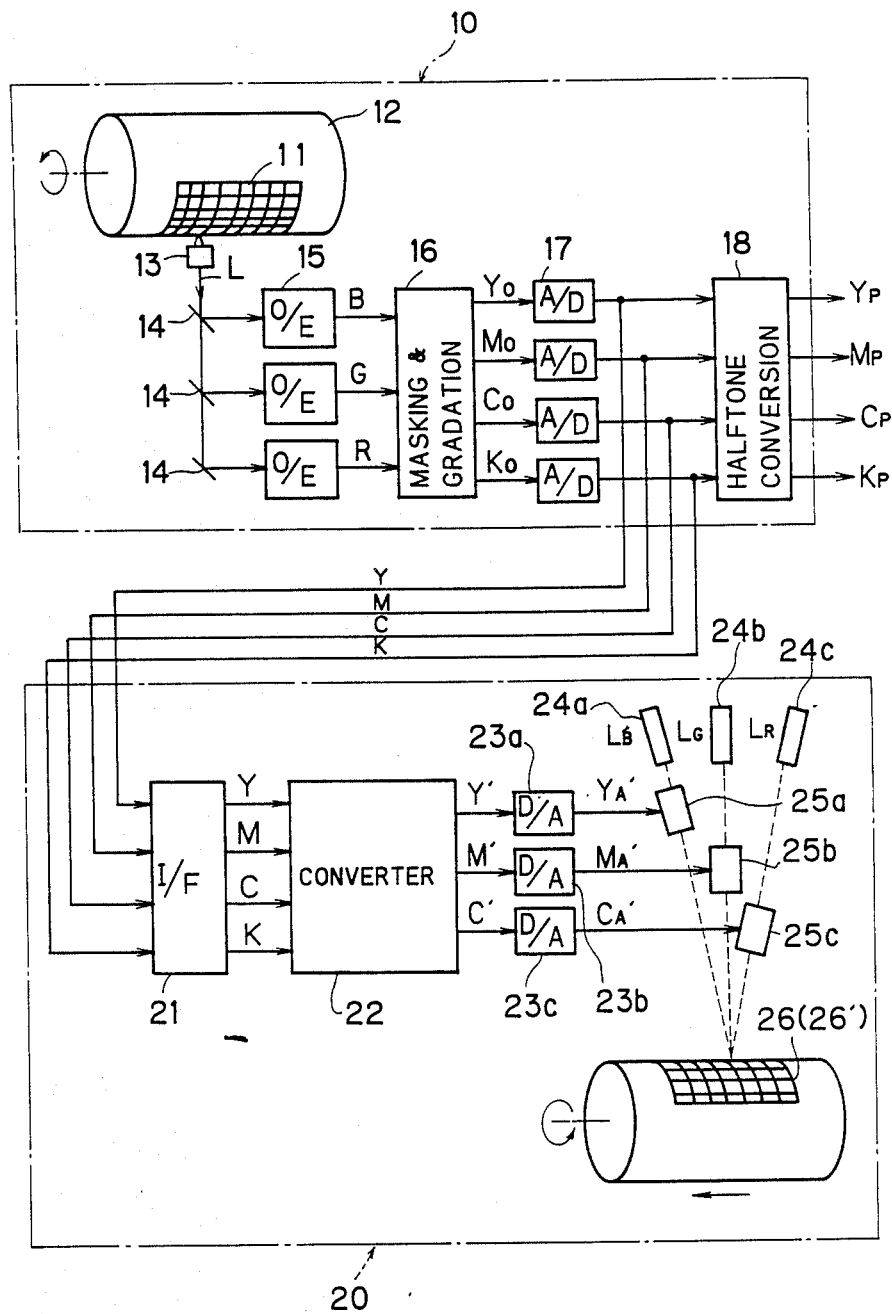
FIGS. 2 and 3 are block diagrams showing the structure of a preferred embodiment of the present invention.

FIG. 2 is a block diagram schematically showing a process color scanner 10 and a proof image generator 20.

In the process color scanner 10, light L emitted from a light source (not shown) located in a transparent original drum 12 penetrates the original drum 12 and an original 11 mounted on the same and reaches a pick-up lens 13. The light L collimated by the pick-up lens 13 is reflected by dichroic mirrors 14 and converted into three electric color signals B, G and R by photoelectric converters 15 including photomultipliers and the like, and is further converted into primary chromatic signals $Y_0$, $M_0$ and $C_0$ and an achromatic signal $K_0$ by a masking and gradation circuit 16. A-D converters 17 convert the analog color signals $Y_0$, $M_0$, $C_0$ and $K_0$ into digital color signals Y, M, C and K indicating respective halftone dot area in percentage.

These halftone rate or percentage signals Y, M, C and K are further converted into halftone dot signals $Y_P$, $M_P$, $C_P$ and $K_P$ expressing halftone dots by a halftone conversion circuit 18. Halftone negatives or halftone positives for respective colors Y, M, C and K are produced in response to respective ones of the halftone dot signals $Y_P$, $M_P$, $C_P$ and $K_P$.

In order to obtain a proof image on a color film, the halftone rate signals Y, M, C and K are transmitted to an interface circuit 21 provided in the proof image generator 20, and from there to a converter 22.

Figure 3:
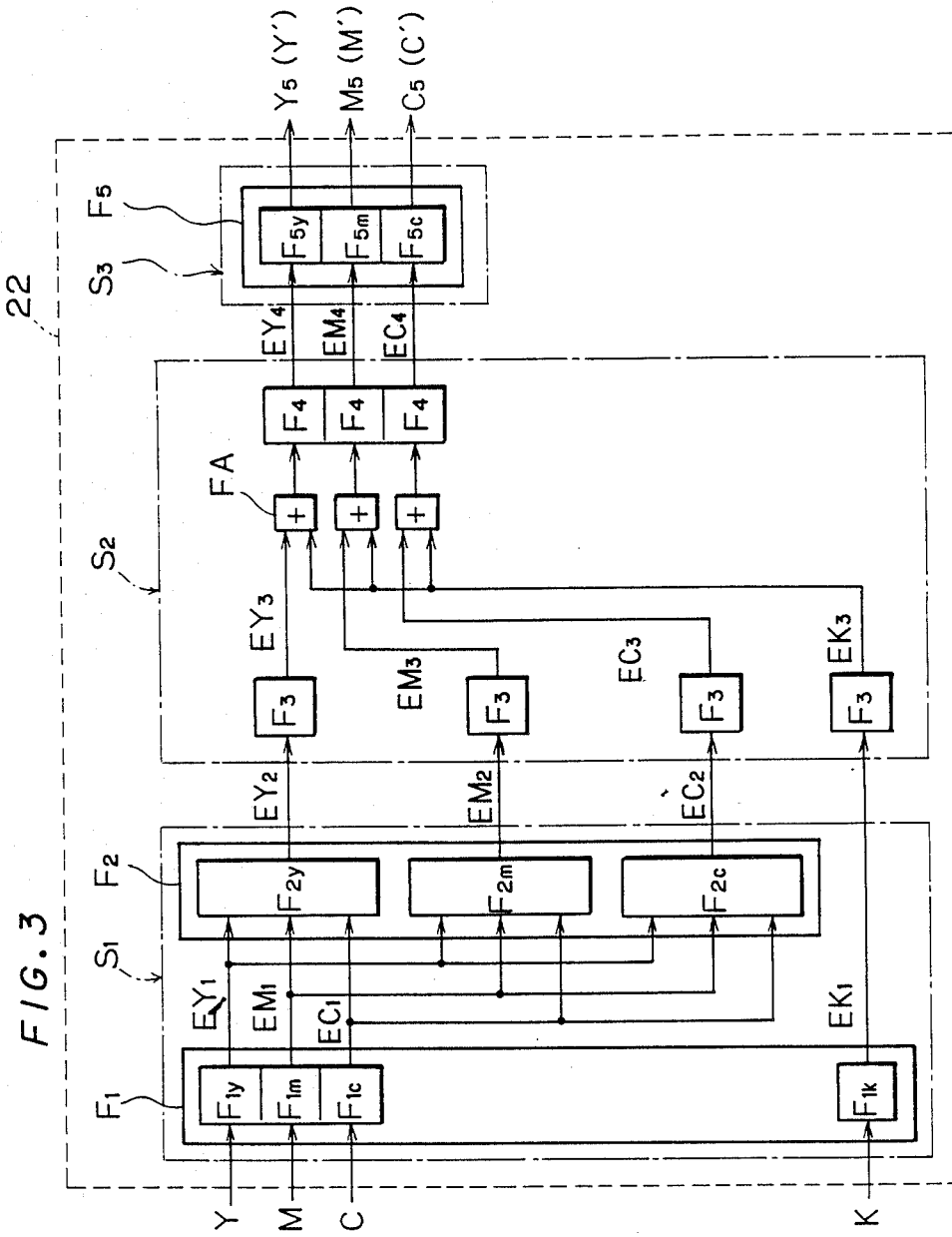

FIG. 3 is a block diagram showing the internal structure of the converter 22 according to the embodiment of the present invention.

The converter 22 comprises first, second and third processors $S_1$–$S_3$. The first processors $S_1$ converts the halftone rate signals Y, M, C and K into equivalent neutral density data $EY_1$, $EM_1$, $EC_1$ and $EK_1$, respectively. The primary chromatic components $EY_1$, $EM_1$ and $EC_1$ within the neutral density data are corrected in the processor $S_1$ so as to compensate for the first additivity failure which is caused by mixture of the primary colors, thereby to obtain primary chromatic components $EY_2$, $EM_2$ and $EC_2$. The second processor $S_2$ corrects for the second additivity failure which is caused through addition of respective ones of the primary chromatic color components $EY_2$, $EM_2$, $EC_2$ and the achromatic color component $EK_1$. The third processor $S_3$ converts equivalent neutral density data $EY_4$, $EM_4$ and $EC_4$ outputted from the second processor $S_2$ into color density data $Y_5$, $M_5$, and $C_5$ for compensating the respective shifts of the characters of a proof image recorder and a color film, with which a proof image will be obtained.

Figure 4:
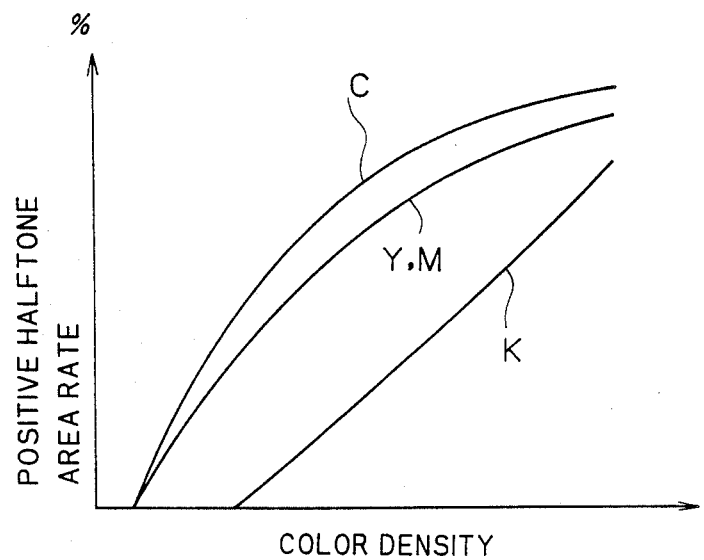
FIG. 4 is a graph showing reproduction curves.
Figure 5:
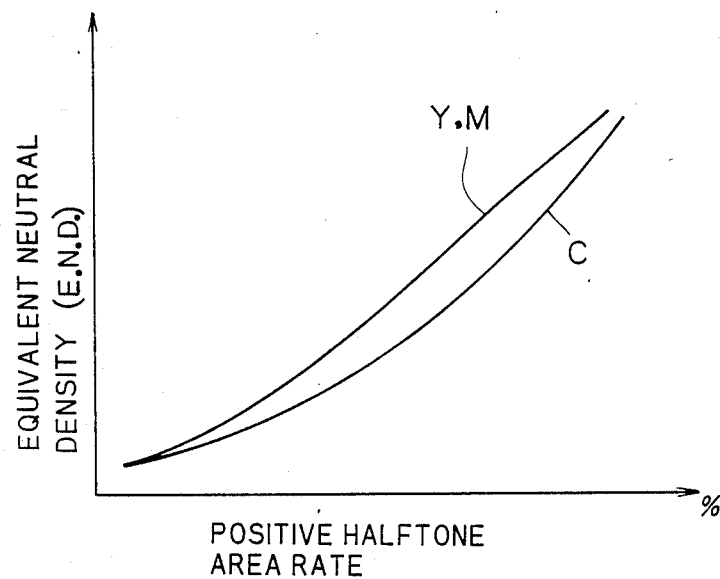
FIG. 5 is a graph showing equivalent neutral E.N.D. balance curves.

Detail of the construction and operation of the converter 22 is as follows: The halftone rate signals Y, M, C and K inputted into the first processor $S_1$ are converted into the equivalent neutral density data $EY_1$, $EM_1$, $EC_1$ and $EK_1$ by density conversion elements $F_1$ ($F_{1y}$, $F_{1m}$, $F_{1c}$ and $F_{1k}$) respectively. FIG. 5 shows examples of E.N.D. balance curves for converting halftone area rate into equivalent neutral density (E.N.D.) valves, which are stored in respective look-up tables in $F_1$. The E.N.D. balance of FIG. 5 is obtained on the basis of gray balance on a color film. Namely, if gray density of 2.0 is reproduced on a color film by combination of color densities of 1.5, 1.6 and 1.7 for yellow, magenta and cyan respectively, the curves are so presented that the respective positive halftone area rates corresponding to the color densities of 1.5 (Y), 1.6 (M) and 1.7 (Y) are converted into the common E.N.D. value of 2.0 through the curves. Alternatively, the halftone rate signals Y, M, C and K may be first converted into color density data respectively, and further converted into the equivalent neutral density (E.N.D.) data $EY_1$, $EM_1$, $EC_1$ and $EK_1$. FIG. 4 shows examples of reproduction curves for converting halftone area rate into color density. The halftone signals Y, M, C and K may be the digital signals expressing color density values before being subjected to the conversion into halftone area rates. In this case, the density conversion elements $F_1$ may be so constructed as to convert the color density values into E.N.D. data.

The E.N.D. data $EY_1$, $EM_1$ and $EC_1$ of the primary chromatic components are processed by color conversion elements $F_2$ ($F_{2y}$, $F_{2m}$ and $F_{2c}$) separately from the E.N.D. data $EK_1$ of the achromatic color component. The color conversion elements $F_{2y}$, $F_{2m}$ and $F_{2c}$ have three-dimensional color solid mapping functions, where a lattice point having coordinates ($EY_1$, $EM_1$, $EC_1$) in a three-dimensional coordinate system is mapped to another lattice point having coordinates ($EY_2$, $EM_2$, $EC_2$). More particularly, respective ones of the color conversion elements $F_{2Y}$, $F_{2m}$ and $F_{2c}$ are in the form of a color conversion table in which the values of the data $EY_2$, $EM_2$ and $EC_2$ are previously written with addresses corresponding to the values of the primary chromatic color component data $EY_1$, $EM_1$ and $EC_1$, respectively.

The color conversion elements $F_2$ are adapted to correct the E.N.D. data $EY_1$, $EM_1$ and $EC_1$ for compensating for the first additivity failure characteristic in the primary chromatic color components obtained through experiential comparison between actual densities of a printed matter and a proof image. A method of setting such color conversion elements $F_2$ is described in detail below.

The E.N.D. data $EY_2$, $EM_2$, $EC_2$ and $EK_1$ outputted from the first processor $S_1$ are converted into E.N.D. data $EY_3$, $EM_3$, $EC_3$ and $EK_3$ respectively by inverse fitting elements $F_3$ located in the second processor $S_2$. The second processor $S_2$ corrects the second additivity failure caused in the following addition of the achromatic component $EK_3$ to the primary chromatic components $EY_3$, $EM_3$ and $EC_3$.

A fitting element $F_4$ is employed in order to correct the second additivity failure. The fitting element $F_4$ is adapted to convert E.N.D. values of respective color components obtained by simply adding the achromatic color component $EK_1$ to the respective ones of the primary chromatic components $EY_2$, $EM_2$ and $EC_2$ into E.N.D. values equivalent to those of the respective color components in a printed matter. As hereinafter described in detail, the fitting element $F_4$ has a conversion characteristic which is expressed with a nonlinear experimentally obtained functions.

In order to perform the conversion, the fitting element $F_4$ holds a function $G_4$ having the following characteristic:

$$EY_4 = G_4 (EY_2 + EK_1) \tag{1a}$$

$$EM_4 = G_4 (EM_2 + EK_1) \tag{1b}$$

$$EC_4 = G_4 (EC_2 + EK_1) \tag{1c}$$

where $EY_4$, $EM_4$ and $EC_4$ represent E.N.D. data of respective color components outputted from the second processor $S_2$. Further, the fitting function $G_4$ is common to the primary chromatic color component data $EY_2$, $EM_2$ and $EC_2$ (or $EY_4$, $EM_4$ and $EC_4$). This is because the data $EY_2$, $EM_2$, $EC_2$ and $EK_1$ are expressed in an E.N.D. value which is common to these color components.

Upon such conversion in accordance with the expressions (1a) to (1c), however, the E.N.D. data $EY_4$, $EM_4$ and $EC_4$ of the primary chromatic components after conversion differ from the original E.N.D. data $EY_2$, $EM_2$ and $EC_2$, respectively, when the achromatic component data $EK_1$ outputted from the first processing means $S_1$ has a value of zero.

However, when the component $EK_1$ is zero and only the primary chromatic component data $EY_2$, $EM_2$ and $EC_2$ have finite values, which have already been subjected to correction of the first additivity failure in the first processor $S_1$, the second processor $S_2$ must output values equal to those of the primary chromatic component data $EY_2$, $EM_2$ and $EC_2$ without correcting for the second additivity failure. This is because the second additivity failure is caused by the addition of the achromatic component $EK_1$ or $EK_3$, and therefore, the correction thereof is not required when an addition is not in fact carried out.

In order to satisfy the requirement, the second processor $S_2$ is provided with the inverse fitting elements $F_2$ holding the inverse functions $G_3$ of the function $G_4$. The inverse fitting elements $F_3$ act upon the primary chromatic component data $EY_2$, $EM_2$, $EC_2$, and $EK_1$ to output data $EY_3$, $EM_3$, $EC_3$ and $EK_3$, respectively. The achromatic color component $EK_3$ is added to the primary chromatic component data $EY_3$, $EM_3$ and $EC_3$ in adder elements FA, to deliver the values obtained through the addition to the fitting elements $F_4$, respectively. The processing in the second processor $S_2$ is expressed as follows:

$$EY_4 = G_4(G_3(EY_2) + G_3(EK_1)) \quad (2a)$$

$$EM_4 = G_4(G_3(EM_2) + G_3(EK_1)) \quad (2b)$$

$$EC_4 = G_4(G_3(EC_2) + G_3(EK_1)) \quad (2c)$$

where $G_4 = (G_3)^{-1}$. When the achromatic component data $EK_1$ has a value of zero, the primary chromatic component data $EY_4$, $EM_4$ and $EC_4$ are equal to the inputted primary chromatic component data $EY_2$, $EM_2$ and $EC_2$, as expressed in the following equations:

$$EY_4 = G_4(G_3(EY_2)) = EY_2 \quad (3a)$$

$$EM_4 = G_4(G_3(EM_2)) = EM_2 \quad (3b)$$

$$EC_4 = G_4(G_3(EC_2)) = EC_2 \quad (3c)$$

Also when none of the primary chromatic component data $EY_2$, $EM_2$ and $EC_2$ have finite values, invariance in density of the achromatic component data $EK_1$ is ensured in the second processor $S_2$.

The primary chromatic component data $EY_4$, $EM_4$ and $EC_4$ thus obtained with correction of the second additivity failure in the second processor $S_2$ are supplied to the third processor $S_3$.

The third processor $S_3$ has correction elements $F_5$ ($F_{5y}$, $F_{5m}$ and $F_{5c}$) for converting the inputs $EY_4$, $EM_4$ and $EC_4$ into the color density data $Y_5$, $M_5$ and $C_5$ (i.e., Y', M' and C' in FIG. 2). The elements $F_5$ are look-up table memories, for example.

A procedure of setting the color conversion elements $F_2$ in the first processor $S_1$ is as follows.

A look-up table having a conversion character corresponding to the color conversion function $G_2$ is called a color conversion table CT. The color conversion table CT is adapted to obtain additive combinations of the primary chromatic components Y, M and C, for color conversion. In the preferred embodiment, the color conversion table CT is created through observing of the densities of a printed matter obtained by overprinting of the color inks corresponding to the primary chromatic components Y, M and C as hereinafter described, whereby the first additivity failure of the combination of the primary chromatic components is compensated through the conversion in the color conversion table CT.

Figure 6:
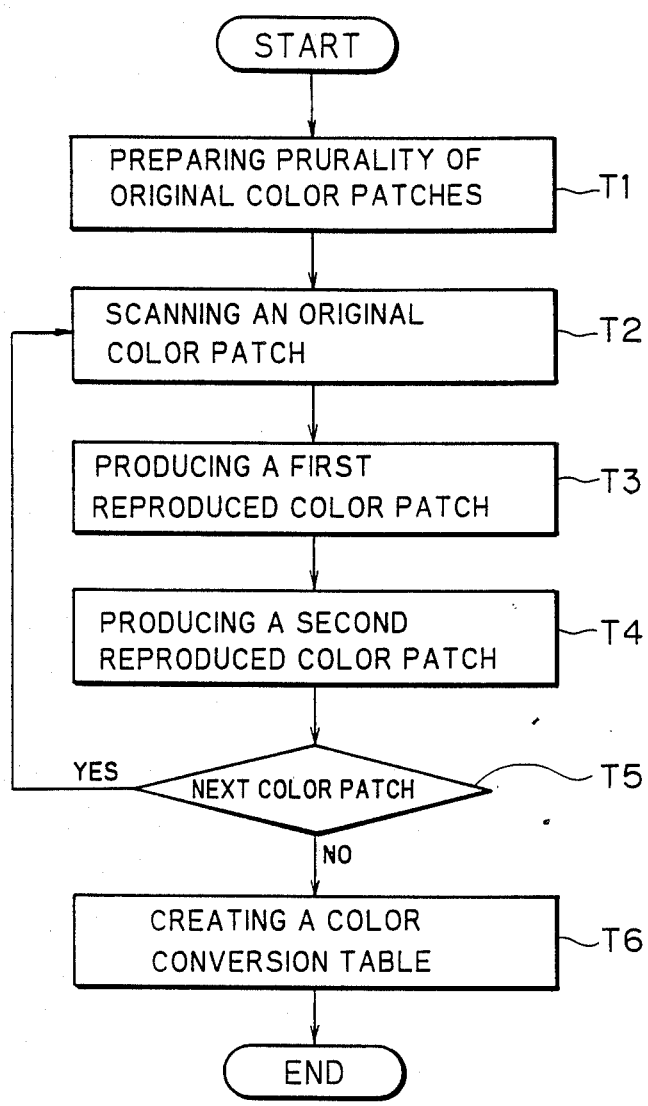
FIG. 6 is a flow chart showing the operation of creating a color conversion table.
Figure 7A:
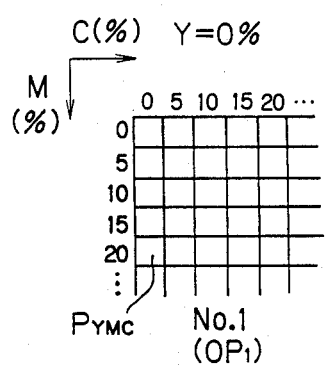
FIGS. 7A–7I illustrate color patches employed for creating a color conversion table.
Figure 7B:
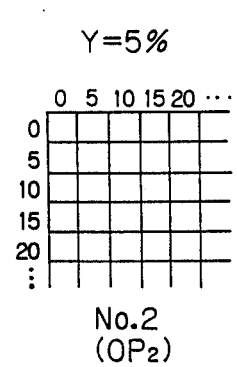
Figure 7C:
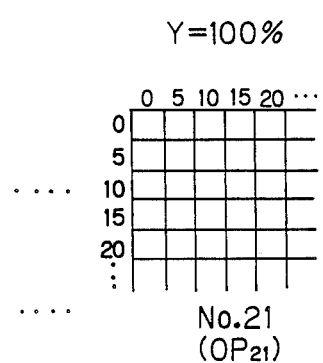

FIG. 6 shows the procedure for setting the color conversion table CT, as follows:

Step T1: A plurality of original color patches, which differ in their density values of the primary chromatic components Y, M and C, are prepared to serve as originals. FIGS. 7A, 7B and 7C illustrate examples of original color patches which are different in distribution of primary chromatic density values. For example, an original color patch No. 1 ($OP_1$) shown in FIG. 7A is formed by a plurality of unit patches $P_{YMC}$ having constant yellow density corresponding to zero percent in halftone area rate, while as magenta and cyan density values in adjacent boxes vary by five percent in the halftone area rate.

Step T2: The first original color patch 11 ($OP_1$) (FIG. 2) of these original color patches is mounted on the original drum 12 to be scanned by the color scanner 10, thereby to obtain the halftone dot signals $Y_P$, $M_P$ and $C_P$. In this process, the image of the original color patch 11 is separated into the chromatic components $Y_O$, $M_O$ and $C_O$ ($Y_P$, $M_P$ and $C_P$) only, while the achromatic component $K_O$ ($K_P$) is set to be zero by an operator.

Figure 7D:
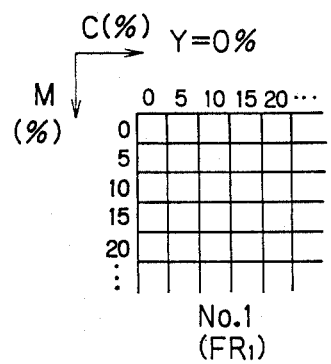

Step T3: On the basis of the respective halftone dot signals $Y_P$, $M_P$ and $C_P$ outputted from the color scanner 10, respective halftone positives of the chromatic colors Y, M and C are actually produced thereby to create a first reproduced color patch $FR_1$ for triple printing by utilizing blocks produced with the halftone positives. FIG. 7D illustrates an example of the first reproduced color patches $FR_1$ thus obtained.

Figure 7E:
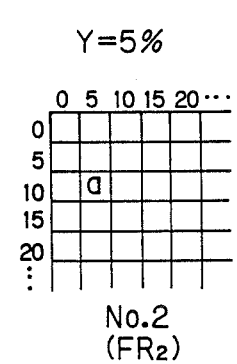
Figure 7F:
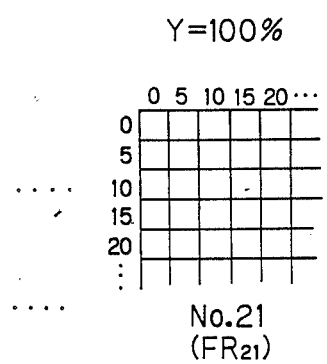
Figure 7G:
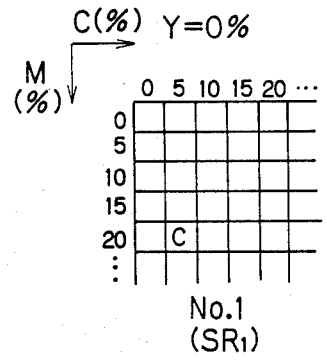
Figure 8:
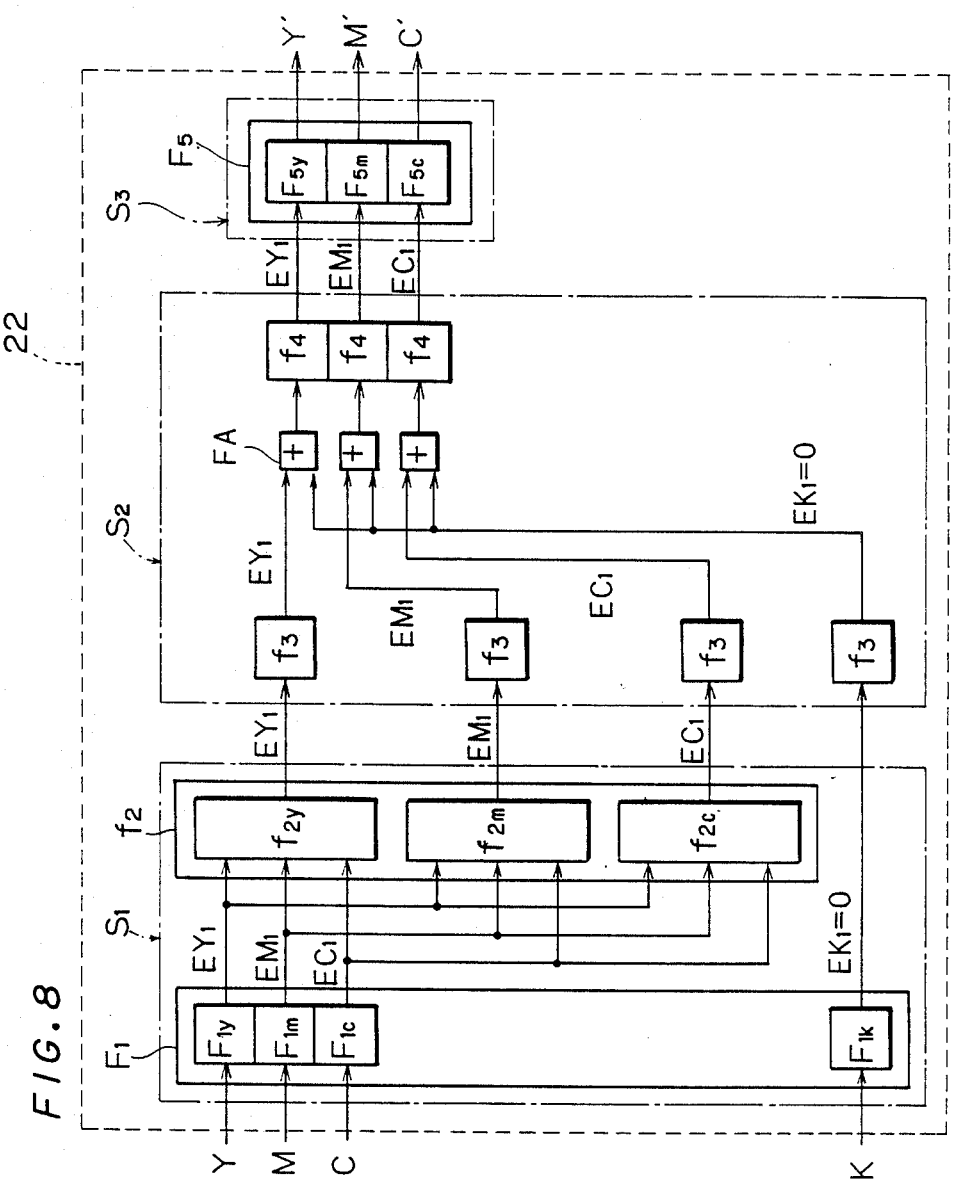
FIG. 8 is a block diagram showing the structure of a converter employed for creating a color conversion table.

Step T4: The halftone rate signals Y, M and C obtained by reading the original color patch $OP_1$ at step T2 are inputted by the converter 22 from the color scanner 10 through the interface circuit 21. Color density data $Y_{40}$, M' and C' outputted from the converter 22 are converted into analog signals $Y'_A$, $M'_A$ and $C'_A$ by D-A converters 23a, 23b and 23c, respectively. Respective laser beams $L_B$, $L_G$ and $L_R$ of blue, green and red emitted from laser generators 24a to 24c, are respectively modulated with acoustic optical modulators (AOM) 25a to 25c, which are controlled by the respective analog signals $Y'_A$, $M'_A$ and $C'_A$, to create a second reproduced color patch 26' ($SR_1$) through an exposure of a color film 26 and development thereof. FIG. 7G illustrates an example of the second reproduced color patch $SR_1$. At this time, the conversion characters in the converter 22 are set to produce a linear conversion so that the color density data Y', M' and C' will have the same density levels as the halftone rate signals Y, M and C. FIG. 8 is a block diagram showing the equivalent structure of the converter 22 in this stage. The elements $F_2$ ($F_{2y}$, $F_{2m}$, $F_{2c}$) of the first processor $S_1$ in FIG. 3 are equivalently replaced with elements $f_2$ ($f_{2y}$, $f_{2m}$, $f_{2c}$) through storage of linear tables therein. The elements $F_3$ and $F_4$ of the second processing means $S_2$ in FIG. 3 are also equivalently replaced with elements $f_3$ and $f_4$ respectively through storage of linear tables therein. The elements $f_{2y}$, $f_{2m}$ and $f_{2c}$ output the input data $EY_1$, $EM_1$ and $EC_1$ themselves respectively, where those three data $EY_1$, $EM_1$ and $EC_1$ are commonly inputted to the elements $f_{2y}$, $f_{2m}$ and $f_{2c}$. The elements $f_3$ and $f_4$ also output the inputted data themselves. This is because the first and the second additivity failure, which will define the functions of the elements $F_2$, $F_3$ and $F_4$, are not known in this stage. However, the elements $f_3$ and $f_4$ may have arbitrary functions under the condition that the elements $f_3$ operate as inverse functions against the elements $f_4$ because invariance of the input data is maintained by those elements $f_3$ and $f_4$ in case the value of the achromatic component $EK_1$ is zero.

Step T5: The first original color patch $OP_1$ is replaced by a second original color patch $OP_2$ to perform the processing of the steps T2 to T4, thereby to reproduce first reproduced color patches $FR_2$ on a printed matter and second reproduced color patches $SR_2$ on a color film respectively. Thereafter the remaining original color patches $OP_3$ (not shown) to $OP_{21}$ are successively mounted on the scanner 10 to be subjected to the identical process, thereby to obtain first reproduced color patches $FR_1$ to $FR_{21}$ and second reproduction color patches SR$_1$ to SR$_{21}$ as to the respective original color patches OP$_1$ to OP$_{21}$.

The original color patches OP$_1$ to OP$_{21}$ employed in the preferred embodiment have colored areas where density values of the respective primary chromatic components are changed stepwise by five percent in the halftone area rate. In order to obtain color image data corresponding to the original color patches, the respective primary chromatic component signals Y, M and C expressing the respective halftone area rates may be generated within the color scanner 10 without reading the image of the original color patches.

Figure 7H:
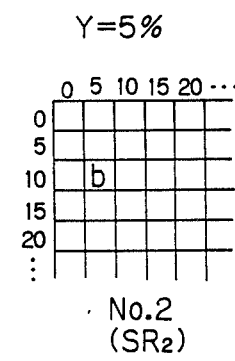
Figure 7I:
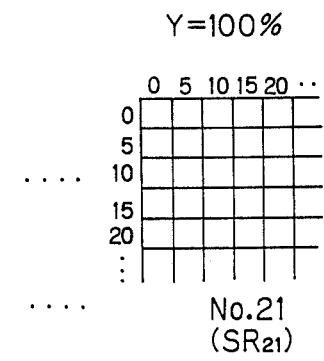

Step T6: Then, the color conversion table CT is created on the basis of the first reproduced, printed color patches FR$_1$ to FR$_{21}$ and the second reproduced, filmed color patches SR$_1$ to SR$_{21}$. The color conversion table CT is constructed to express the relation between the colors on the unit patches of the first reproduced color patches FR$_1$ to FR$_{21}$ and those on the unit patches of the second reproduced color patches SR$_1$ to SR$_{21}$ with respect to common original colors. For example, the color of a unit patch a (Y=5%, M=10%, C=5%) of the first reproduced color patch FR$_2$ in FIG. 7E should be matched with color of a unit patch b of the second color patch SR$_2$ in FIG. 7H. In this case, a unit patch being identical in color (or approximate in hue) to the unit patch a is found within the second color patches SR$_1$ to SR$_{21}$, through human observation or density measurement. It is assumed here that the said unit patch is found to be the unit patch c in the color patch SR$_1$. Then, a color conversion table CT is so formed as to convert coordinates of a lattice point corresponding to the unit patch b (hereinafter referred to as a subject patch) into coordinates of a lattice point corresponding to the unit patch c (hereinafter referred to as a matching patch) in a three-dimensional color space. Such operation is repeated for every unit patch to create the color conversion table CT.

Figure 9:
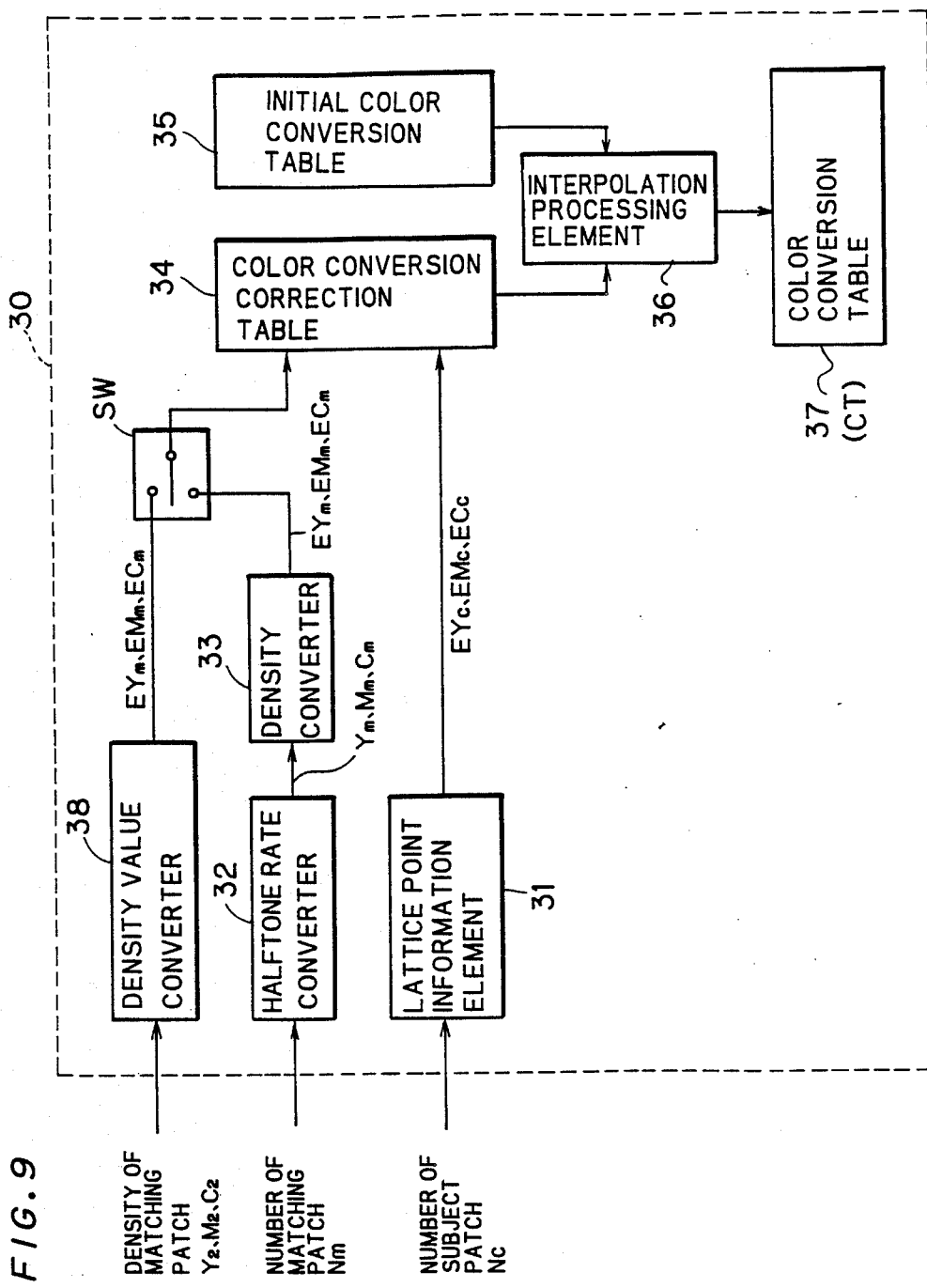
FIG. 9 is a block diagram showing structure of a color conversion table generator.

FIG. 9 is a function diagram showing a color conversion table generator 30 which is constructed with an off-line computer, for example.

A unit patch number Nc of the subject patch b is inputted in a lattice point information element 31. Different unit patch numbers are provided for each different unit patch having different halftone area rates Y, M and C. The relation between the unit patch numbers and the halftone area rates Y, M and C are previously set in the lattice point information element 31. Since the halftone area rates Y, M and C corresponding to respective unit patches of the first reproduced color patches FR$_1$ to FR$_{21}$ can be previously known, the halftone area rates Y, M and C may be directly inputted to the lattice point information element 31 in place of the unit patch numbers. The lattice point information element 31 converts the inputted unit patch number Nc into coodinate data EY$_c$, EM$_c$ and EC$_c$ for a color conversion correction table element 34. The coordinate data EY$_c$, EM$_c$ and EC$_c$ are obtained as E.N.D. values.

A unit patch number Nm of the matching patch c is inputted in a halftone rate converter 32. The halftone rate converter 32 converts the unit patch number Nm into halftone area rates Y$_m$, M$_m$ and C$_m$. The data thus converted into halftone percentage are supplied to a density converter 33 to be converted into matching density data EY$_m$, EM$_m$ and EC$_m$ expressed in E.N.D.

Figure 10A:
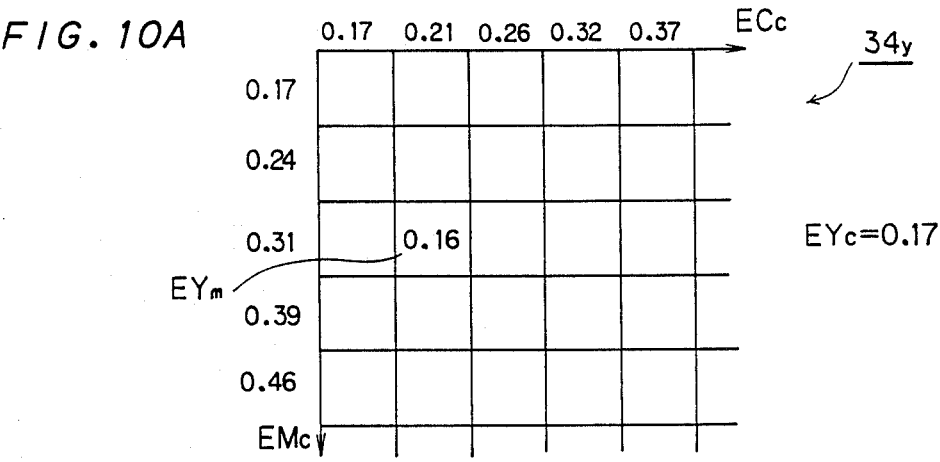
FIGS. 10A–10B illustrate a color conversion correction tables.
Figure 10B:
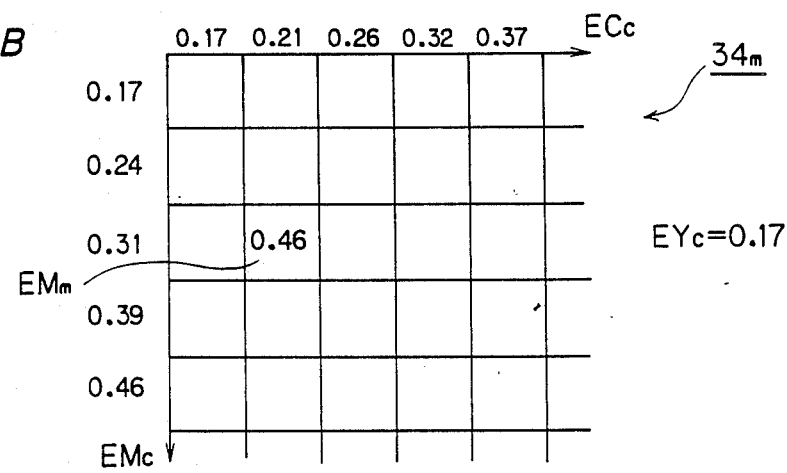
Figure 10C:
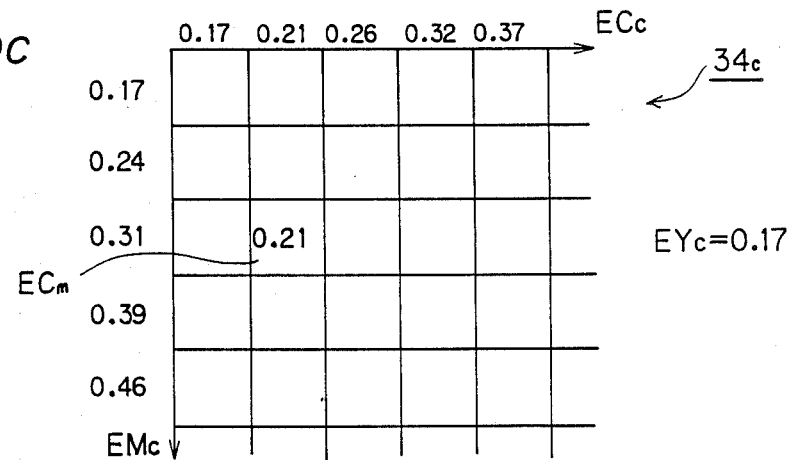

The coordinate data EY$_c$, EM$_c$ and EC$_c$ and the matching density data EY$_m$, EM$_m$ and EC$_m$ are inputted in a color conversion correction table 34. The matching density data EY$_m$, EM$_m$ and EC$_m$ are written in a three-dimensional address in the color conversion table 34 designated by the coordinate data EY$_c$, EM$_c$ and EC$_c$, to specify a conversion rule at the lattice point corresponding to the coordinate data. Such processing is repeated to create the color conversion correction table 34. FIG. 10 shows an example of the color conversion correction table 34. The color conversion correction table 34 consists of three subtables 34$_y$, 34$_m$ and 34$_c$ corresponding to the matching density data EY$_m$, EM$_m$ and EC$_m$ respectively. For example, the matching density data EY$_m$ (=0.16), EM$_m$ (=0.46) and EC$_m$ (=0.21) are stored in the subtables 34$_y$, 34$_m$ and 34$_c$ respectively at the common lattice point defined by the coordinates (EY$_c$, EM$_c$, EC$_c$)=(0.17, 0.31, 0.21). The lattice point (EY$_c$, EM$_c$, EC$_c$)=(0.17, 0.31, 0.21) corresponds to the unit patch b shown in FIG. 7H, and the coordinates thereof are obtained by converting the halftone area rates (Y, M, C)=(5%, 10%, 5%) of the unit patch b into E.N.D. data along the relation shown in FIG. 5. Further, the matching density data EY$_m$ (=0.16), EM$_m$ (=0.46) and EC$_m$ (=0.21) are obtained by converting the halftone area rates Y (=0%), M (=20%) and C (=5%) of the unit patch c into E.N.D. data along the relation shown in FIG. 5. In practice, lattice coordinates (EY$_c$, EM$_c$, EC$_c$) and matching density data (EY$_m$, EM$_m$, EC$_m$) are provided not as analog values as shown in FIG. 10 but as digital values of eight bits, for example. A density range of 0.1 to 2.5, for example, is expressed as a digital value ranging between 0 to 255 defined by eight bits.

The color conversion correction table 34 is combined with an initial color conversion table 35 through an interpolation processing element 36 to obtain a color conversion table 37 (CT). The initial color conversion table 35 and the color conversion table 37 are in the same form as the color conversion correction table 34 shown in FIG. 10, so that both of the initial color conversion table 35 and the color conversion table 37 consist of three subtables corresponding to three matching data EY$_m$, EM$_m$ and EC$_m$, respectively.

When the color conversion table 37 (CT) is initially created, coordinate values of the lattice points themselves are stored as matching data in respective lattice points of the initial color conversion table 35. Namely, data EY$_c$, EM$_c$ and EC$_c$ are respectively stored at lattice points having coordinates of (EY$_c$, EM$_c$, EC$_c$) in three subtables of the initial color conversion table 35. Data respectively stored in the initial color conversion table 35 and the color conversion correction table 34 are supplied to the interpolation processing element 36 to create the color conversion table 37 through interpolation.

It is possible to employ not the unit patch numbers but rather actually measured color density data Y$_2$, M$_2$ and C$_2$ as the data concerning the color to be converted. In this case, the color density data Y$_2$, M$_2$ and C$_2$ are converted into E.N.D. values by a density value converter 38, thereafter to supply the same to the color conversion correction table 34 through a switch SW.

Now, the interpolation process performed by the interpolation processing element 36 will be described.

Figure 11:
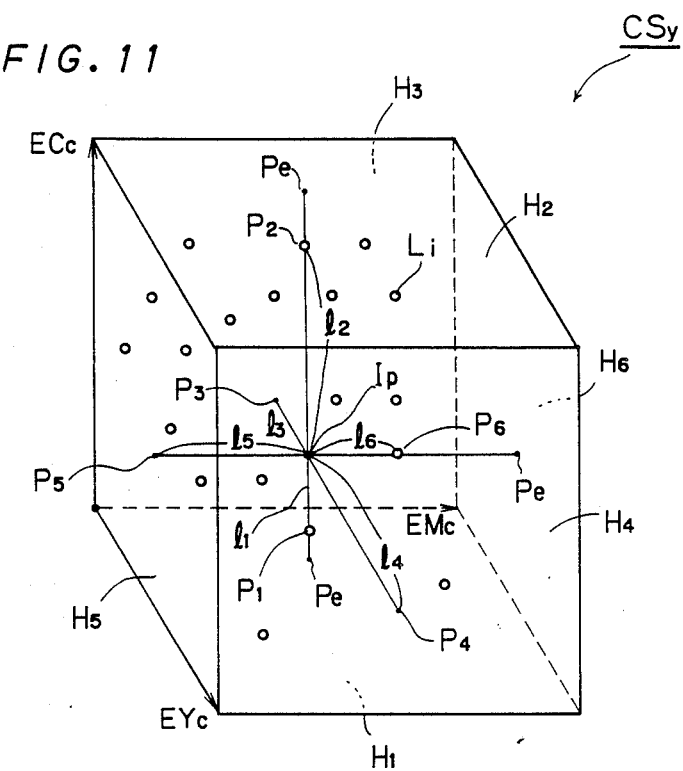
FIG. 11 illustrates a color space of color conversion correction table.

FIG. 11 shows a color space CS$_y$ corresponding to the subtable 34$_y$. The color space CS$_y$ is cubic and is surrounded by six end planes H$_1$ to H$_6$. The matching density data are related to one or more lattice points L$_i$, respectively, which are shown as white circles in FIG. 11. The lattice points L$_i$ having the matching density data will be referred to as effective lattice point. Interpolation data FY at a lattice point $I_P(EY_I, EM_I, EC_I)$ is obtained as follows. If a matching density data $EY_m$ is given at the lattice point $I_P$ in the color conversion correction table 34, the same is used as the interpolation data FY for the color conversion table 37. If a matching data is not given at the lattice point $I_P$, the interpolation data FY is obtained by linear interpolation with the following equation (4).

$$FY = EY_0 + \tfrac{1}{3} \{(DY_1 - EY_1)l_2/(l_1 + l_2) + \qquad (4)$$
$$(DY_2 - EY_2)l_1/(l_1 + l_2) + (DY_3 - EY_3)l_4/(l_3 + l_4) +$$
$$(DY_4 - EY_4)l_3/(l_3 + l_4) + (DY_5 - EY_5)l_6/(l_5 + l_6) +$$
$$(DY_6 - EY_6)l_5/(l_5 + l_6)\}$$

where
- FY: interpolation data at the lattice point $I_P$
- $EY_0$: matching density data at the lattice point $I_P$, stored in the initial color conversion table 35
- $DY_i$ ($i=1-6$): matching density data stored in the color conversion correction table 34 corresponding to six reference lattice points $P_1-P_6$
- $EY_i$ ($=1-6$): matching density data stored in the initial color conversion table 35 according to the six reference lattice points $P_1-P_6$
- $l_i$ ($i=1-6$): distances from the lattice point $I_P$ to the six reference lattice points $P_1-P_6$ The six reference lattice points $P_1-P_6$ are defined as those points which are the nearest points from the lattice point $I_P$ along six direction lines which are parallel or antiparallel to the coordinate axes $EY_c$, $EM_c$ and $EC_c$. FIG. 11 shows the six reference lattice points $P_1-P_6$ for the lattice point $I_P$. If an effective lattice point, for which a matching density data is stored in the color conversion correction table 34, does not exist along a direction line from the lattice point $I_P$, an end point $P_e$ being an intersection point of the direction line with corresponding one of the six end planes $H_1-H_6$ is selected as the reference point $P_i$, where matching density data $DY_i$ and $EY_i$ are equal to each other in the equation (4). Further, if the initial color conversion table 35 has an effective lattice point $LL_i$ (not shown) between the lattice point $I_P$ and the end point $P_e$, the effective lattice point $LL_i$ may be selected as the reference point $P_i$. In the case of FIG. 11, the reference lattice points $P_1$, $P_2$ and $P_6$ are the effective lattice points and the other reference points $P_3$, $P_4$ and $P_5$ exist on the end planes $H_3$, $H_4$ and $H_5$ respectively. Consequently, the values of the data $DY_3$, $DY_4$ and $DY_5$ are equal to those of $EY_3$, $EY_4$ and $EY_5$, respectively.

The interpolation equation (4) has been adapted the yellow component of color image data, but the same equation is also adaptable the magenta component and to the cyan component to obtain interpolation data FM and FC, respectively. The interpolation data FY, FM and FC are stored in the color conversion subtables $37_y$, $37_m$ and $37_c$ respectively as matching density data.

As described above, the color conversion table CT is formed to convert the original density data $EY_1$, $EM_1$ and $EC_1$ into the converted density data $EY_2$, $EM_2$ and $EC_2$ on the basis of the reproduced colors on an actual printed matter and a color film, whereby density on the color film printed by utilizing the converted density data $EY_2$, $EM_2$ and $EC_2$ is made coincident with density on the printed matter obtained by overprinting the primary chromatic color inks with each other. Thus, correction of the first additivity failure between the primary chromatic components is performed by the color conversion table CT.

The subtables $37_y$, $37_m$ and $37_c$ of the color conversion table CT are set in the color conversion elements $F_{2y}$, $F_{2m}$ and $F_{2c}$ (FIG. 3), respectively. The coordinate data $EY_c$, $EM_c$ and $EC_c$ correspond to the E.N.D. data $EY_1$, $EM_1$ and $EC_1$ respectively, and the matching density data SY, SM and SC correspond to the E.N.D. data $EY_2$, $EM_2$ and $EC_2$, respectively. Next, a method of actually obtaining the fitting element $F_4$ for correcting for the second additivity failure will be described.

As hereinabove described, the fitting element $F_4$ is also formed as a look-up table, similar to the color conversion element $F_2$. A table that is stored in the fitting element $F_4$ is referred to herein as the fitting table FT.

Figure 12:
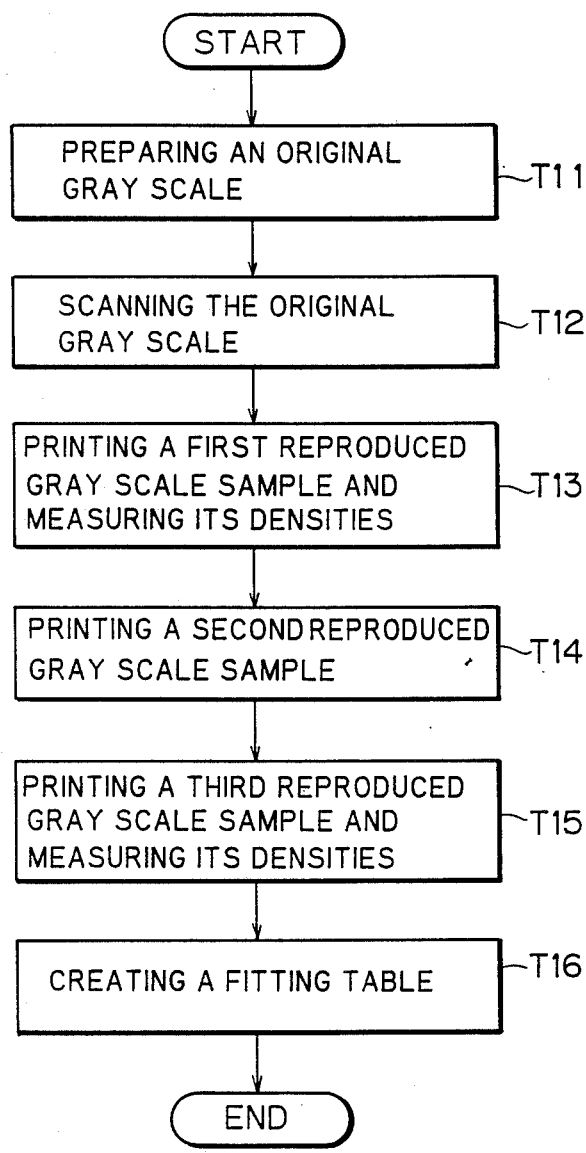
FIG. 12 is a flow chart showing the procedure of creating a fitting table.
Figure 13A:
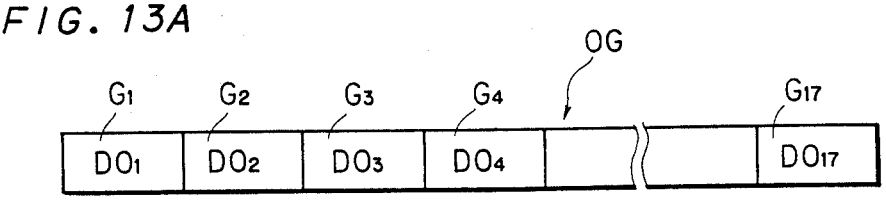
FIGS. 13A–13C illustrate gray scales employed for creating a fitting table.

FIG. 12 is a flow chart showing the following procedure of creating the fitting table FT:

Step T11: An original gray scale OG (FIG. 13A) is prepared which contains several stepwise increasing gray levels, from a gray step $G_1$ to a gray step $G_{17}$. Density values of the respective gray steps $G_1$, $G_2$, ... $G_{17}$ are expressed with the symbols $DO_1$, $DO_2$, ... $DO_3$.

Step T12: The original gray scale OG is scanned to read the various densities thereof.

Figure 13B:
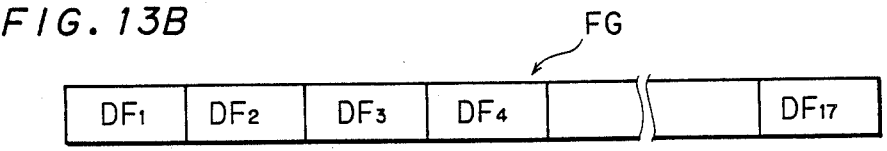

Step T13: Halftone positives for respective colors Y, M and C are produced on the basis of the halftone dot signals $Y_P$, $M_P$ and $C_P$ outputted from the color scanner 10 which scans the original gray scale OG, to print a first reproduced gray scale sample FG (FIG. 13B) for triple printing by utilizing the blocks produced with the halftone positives. Then, density values $DF_1$, $DF_2$, ... $DF_{17}$ of respective gray steps of the first reproduced gray scale sample FG are measured.

Step T14: A second reproduced gray scale sample is printed using only black (K) so that density values of respective gray steps thereof are identical to those of the respective gray steps of the first reproduced gray scale sample FG.

Figure 13C:
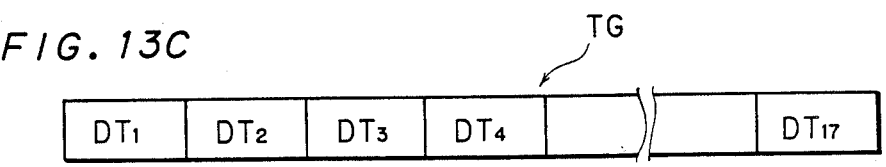
Figure 14:
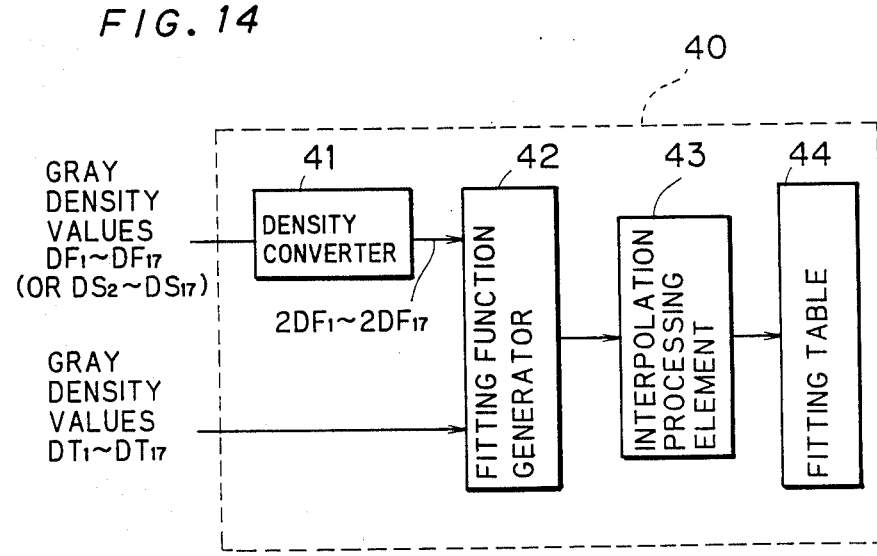
FIG. 14 is a block diagram showing the structure of a fitting table generator.

Step T15: The blocks for respective colors Y, M and C employed for printing the first reproduced gray scale sample FG and the block for the K printer employed for printing the second reproduced gray scale sample are utilized to print a third reproduced gray scale sample TG (FIG. 13C) by quadruple printing, and then, the density values $DT_1$, $DT_2$, ... $DT_{17}$ of respective gray steps of this sample are measured.

Figure 15:
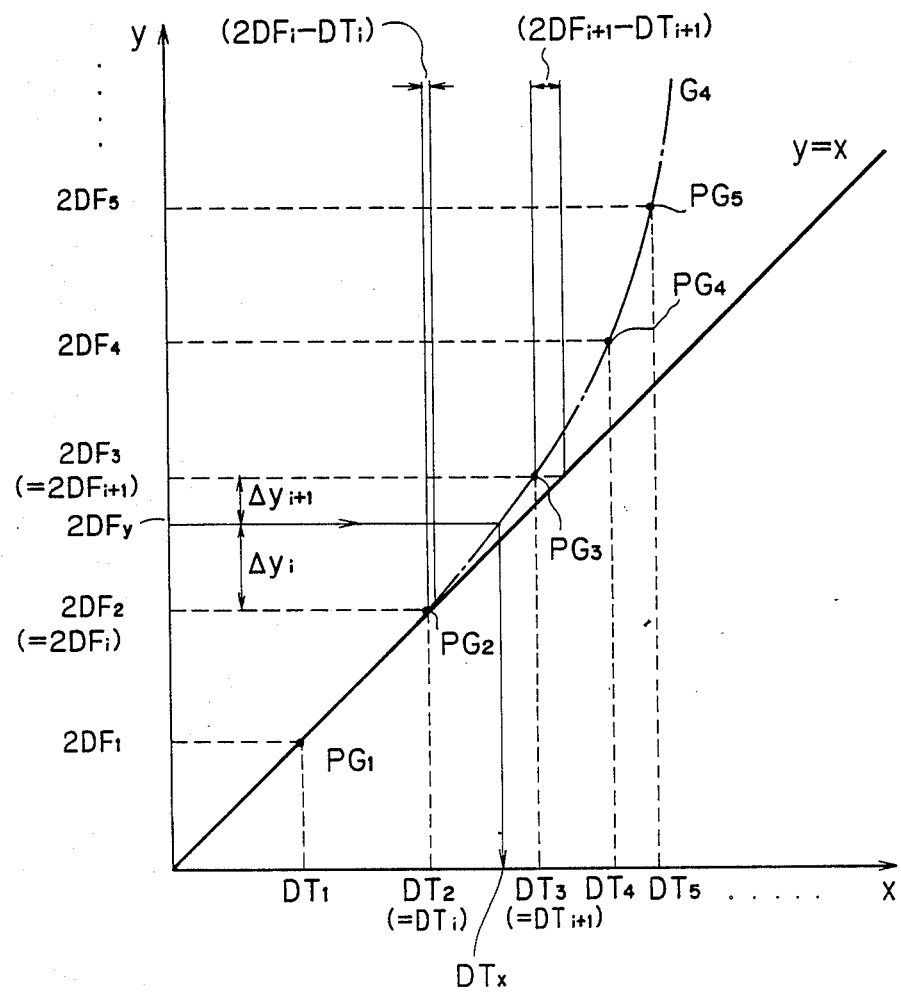
FIGS. 15 and 16 are graphs showing fitting functions.

Step T16: A fitting table is created on the basis of actual density data obtained for the reproduced gray scale samples. FIG. 15 is a block diagram showing the internal structure of a fitting table generator 40 which is constructed by an off-line computer for example.

The density values $DF_1$ to $DF_{17}$ of the first reproduced gray scale sample FG or the density values $DS_1$ to $DS_{17}$ of the second reproduced gray scale sample are inputted in a density converter 41. These samples are identical in density to each other in the respective gray steps, and hence density data of either sample are applicable. The density converter 41 doubles the inputted data to output the same. This processing corresponds to simple addition of density values of the Y, M and C prints and the density value of the K print. Since the additivity failures are not present in a color film, the density converter 41 doubling the inputted data substantially gives gray densities of a color film which will be obtained through the color image data employed for reproducing the third reproduced gray scale sample TG.

Output values of $2DF_1$, to $2DF_{17}$ from the density converter 41 and the density values $DT_1$ to $DT_{17}$ of the third reproduced gray scale sample TG are inputted in a fitting function generator 42. The fitting function generator 42 specifies reference gray points defined on the two-dimensional coordinate plane defined with a y-axis (additivity axis) and an x-axis (additivity failure axis) as shown in FIG. 15, on the basis of the relation between the doubled density values $2DF_1$ to $2DF_{17}$ of the respective gray steps of the first reproduced gray scale sample FG and the density values $DT_1$ to $DT_{17}$ of the respective gray steps of the third reproduced gray scale sample TG. The reference gray points $PG_1, \ldots PG_5$ having coordinate values $(DT_1, 2DF_1), \ldots (DT_5, 2DF_5)$ are plotted in FIG. 15.

Figure 16:
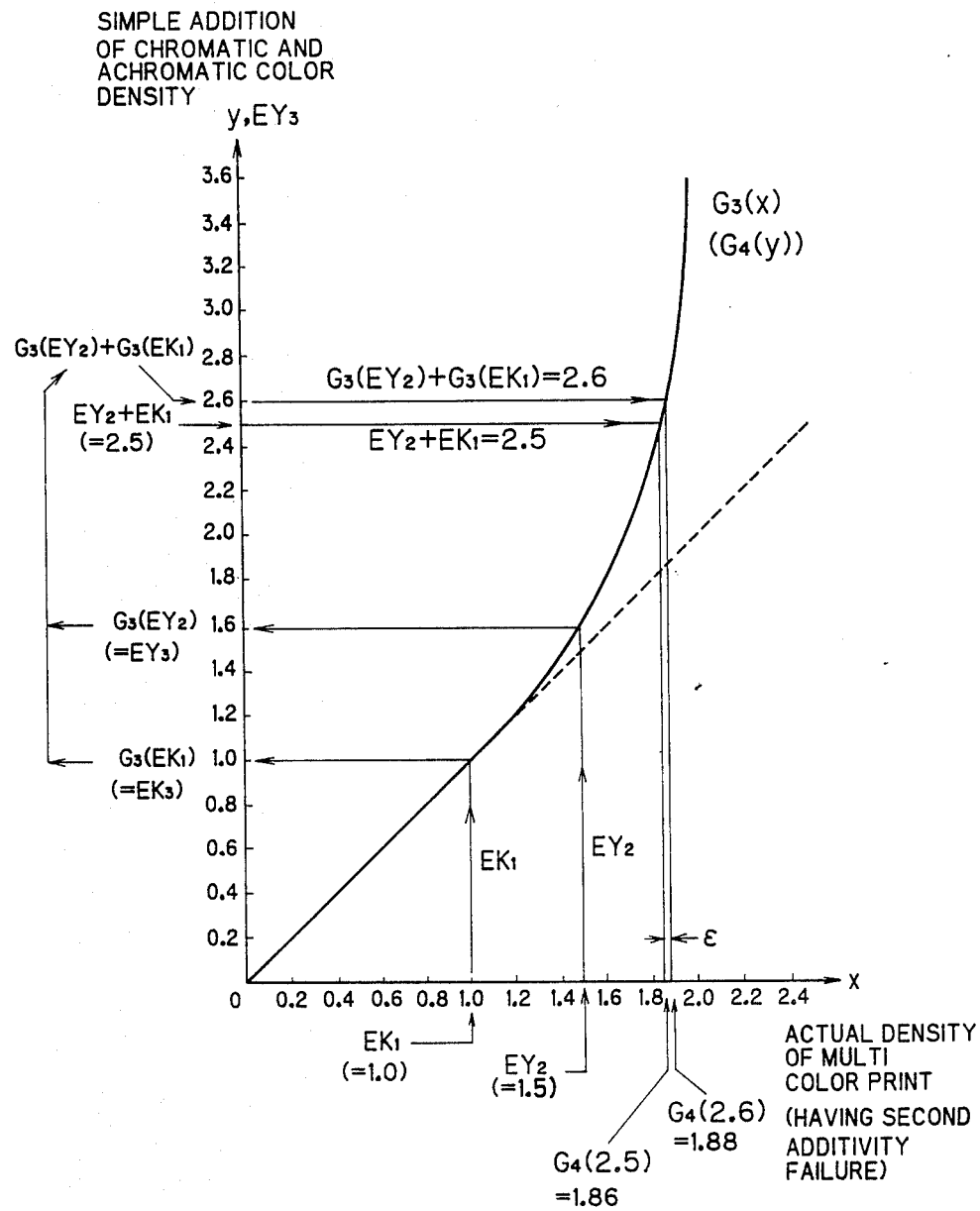

The coordinate data as to the reference gray points are delivered to an interpolation processing element 43, in which the reference gray points are interpolated to yield the fitting function $G_4$, thereby to create a fitting table 44. This interpolation is expressed by the following equation (5) for example.

$$DT_x = 2DF_y - \{(2DF_i - DT_i)\Delta y_{i+1}/(\Delta y_i + \Delta y_{i+1}) + (2DF_{i+1} - DT_{i+1})\Delta y_i/(\Delta y_i + \Delta y_{i+1})\} \quad (5)$$

where $DT_x$: interpolated density value defined on the x-axis $2DF_y$: density value on the y-axis at which interpolated density value on the x-axis is obtained $2DF_i$, $2DF_{i+1}$: density values of reference gray points $PG_i$ and $PG_{i+1}$ on the y-axis neighboring the density value $2DF_y$ $DT_i$, $DT_{i+1}$: density values of reference gray points $PG_i$ and $PG_{i+1}$ on the x-axis $\Delta y_i$, $\Delta y_{i+1}$: respective differences between density values $2DF_y$ and $2DF_i$, and between density values $2DF_{i+1}$ and $2DF_y$ FIG. 16 shows the fitting function $G_4$ thus obtained. Namely, the fitting table 44 operates according to the fitting function $G_4$ for conversion from simple addition of the primary chromatic components and the achromatic component into another density data in which the second additivity failure is already compensated. The y-axis and the x-axis correspond to the input and the output of the table 44, respectively. Assuming that the x-axis represents the input and the y-axis represents the output to the contrary, the inverse function $G_3$ of the fitting function $G_4$ is obtained.

The fitting function $G_4$ is generated in the form of a look-up table and is set in the fitting element $F_4$ provided in the second processor $S_2$ in FIG. 3. The inverse function $G_3$ is also set in the inverse fitting element $F_3$. Because the color image data in the second processor $S_2$ are expressed as E.N.D. values, which indicate equivalent gray densities, the fitting function $G_4$ and the inverse fitting function $G_3$ are common to all of the primary chromatic components and those functions $G_3$ and $G_4$ obtained on the basis of gray density measurement are directly applicable to the element $F_3$ and $F_4$ respectively in the second processor $S_2$.

Since the fitting element $F_4$ is obtained as described above, the correction taking place in the second processor $S_2$ compensates the second additivity failure characteristic observed in actual overprinting. Also in case of compensating additivity failure in different printing methods (offset printing of different types of halftone dot, gravure printing, etc.), the table stored in the fitting element $F_4$ can be easily generated by obtaining actual density data according to the method described above.

As already point out, the inverse fitting function $G_3$ is introduced in order to ensure invariance in density of the primary chromatic components $EY_2$, $EM_2$ and $EC_2$ in the second processor $S_2$ when the value of the achromatic component $EK_1$ is zero. Therefore, when the achromatic component has a finite value, correction of the second additivity failure through the inverse function $G_3$ and the fitting function $G_4$ includes an error with respect to correction of the second additivity failure in comparison with a correction through the fitting function $G_4$ only.

The value of this error can be estimated through the following discussion with reference to the graph of the fitting function $G_4$ shown in FIG. 16.

When the density value $EY_2$ of the Y component is 1.5 and the density value $EK_1$ of the K component is 1.0, for example, density value $EY_2 + EK_1$ obtained by simply adding up these values is 2.5. Therefore, when the density value $EY_2 + EK_1$ ($=2.5$) is transformed through the fitting function $G_4$ without a preliminary transformation through the inverse function $G_3$, the density value $G_4(2.5)$ after such correction is 1.86, as shown in FIG. 16. On the other hand, when the respective density values $EY_2$ and $EK_1$ are preliminarily transformed through the inverse function $G_3$, the transformed values are $G_3(EY_2) = 1.6$ and $G_3(EK_1) = 1.0$, and an added value $G_3(EY_2) + G_3(EK_1)$ is equal to 2.6. The added value is further converted by the fitting function $G_4$, such that the correction value $G_4(2.6)$ receives the value 1.88 is obtained. Therefore, an error or deviation of 0.02 between the value $G_4(2.6)$ in the preferred embodiment and the ideal correction value $G_4(2.5)$ is present. Such an error causes practical problem in practice, and correction of the second additivity failure by the second processor $S_2$ is sufficient for a practical reproduction, regardless of the value of the achromatic component $EK_1$.

Although a color film is employed for the image reproducing means in the preferred embodiment, a color CRT can also be employed as the image reproducing means.

Further, the density converter $F_1$ is not necessarily placed in the first processor $S_1$, but may be provided in the exterior thereof. The important feature of the present invention is that the equivalent neutral density signals $EY_1$, $EM_1$ and $EC_1$ are inputted in the color conversion element $F_2$ of the first processor $S_1$.

Further, the interpolation along the equations (4) and (5) for creating the color conversion table CT and the fitting table are linear interpolation, but non-linear interpolation by polynominal fitting, for example, is also possible.

According to the present invention, the first and second additivity failure can be compensated for precisely and in coincidence with actual overprinting. Thereby, a color image which is very close to an actual printed matter can be reproduced or displayed by another color reproducing means while correction means required for compensating for the additivity failures can be easily set.

In the second processor $S_2$, the primary chromatic components $EY_2$, $EM_2$ and $EC_2$ and the achromatic component $EK_1$ processed in the first processor $S_1$ are converted by the inverse function element $F_3$, respectively, to be thereafter added up, thereby to make the fitting element F₄ act upon the added value. Thus, invariance in density of the primary chromatic components $EY_2$, $EM_2$ and $EC_2$ can be ensured when there is no achromatic component $EK_1$ and invariance in density of the achromatic component $EK_1$ can be ensured when there are no primary chromatic components $EY_2$, $EM_2$ and $EC_2$.

Although the present invention has been described and illustrated in detail, it should be understood that the same is by way of illustration and example only and is not to be taken by way of limitation, the spirit and scope of the present invention being limited only by the terms of the appended claims.

What is claimed is:

1. A method of correcting color image data to obtain therefrom a viewable proof image which is indicative of the colors that will appear in a printed image produced according to said color image data, said method comprising the steps of:
   (a) providing reference color image data,
   (b) printing a first reproduced image with color inks, according to said reference color image data,
   (c) producing a second reproduced image with a non-ink-based image producing device based on said reference color image data, said image producing device having a color mixing result which is different from a color mixing result obtained with said color inks,
   (d) comparing said first and second reproduced images and determining the difference between the respective color mixing results, obtained with said color inks and said image producing device,
   (e) defining a correction rule for compensating said difference,
   (f) reading an image of an original with a color image reader and obtaining first color image data consisting of chromatic and achromatic components, and
   (g) correcting said first color image data using said correction rule to obtain second color image data consisting of chromatic components, and generating a colored proof image whose colors are indicative of the colors in a printed image which is reproduced on the basis of said first color image data.

2. A method in accordance with claim 1, wherein said step (g) includes the step of:
   (g-1) correcting said chromatic components of said first color image data to obtain intermediate color image data consisting of chromatic components which are compensated for a first additivity failure caused by mixture of chromatic components, and
   (g-2) combining the chromatic components included in said intermediate color image data with said achromatic component included in said first color image data, to obtain said second color image data.

3. A method in accordance with claim 2, wherein said correction rule is based on a first additivity failure correction function and is effective for compensating for color discrepancies caused by said first additivity failure, and
said step (g-1) is carried out using said first additivity failure correction function.

4. A method in accordance with claim 3, wherein said difference is determined for a plurality of colors in said step (d), and
said first additivity failure correction function is obtained through an interpolation of said difference for said plurality of colors.

5. A method in accordance with claim 4, wherein said step (g-2) further includes the steps of:
   (g-2a) converting said chromatic components of said intermediate color image data into first data consisting of chromatic components through an inverse function associated with a second additivity failure correction function, said second additivity failure correction function being so determined as to compensate for a second additivity failure caused by mixture of chromatic components and an achromatic component,
   (g-2b) converting said achromatic component of said first color image data into second data consisting of achromatic color components through said inverse function,
   (g-2c) adding said second data to respective chromatic components of said first data to obtain third data consisting of chromatic components, and
   (g-2d) converting said third data into said second color image data through said second additivity failure correction function.

6. A method in accordance with claim 5, wherein said reference color image data contains color image data in the form of a scale of chromatic color, and
said first additivity failure correction function is determined by comparing said first and second reproduced images obtained through said reference color image data.

7. A method in accordance with claim 6, wherein said reference color image data is obtained through the step of reading respective colors of color patches with said color image reader, where different colors are provided on different ones of said color patches.

8. A method in accordance with claim 6, wherein said second additivity failure correction function is determined through the steps of:
   (h-1) preparing a reference gray image data having chromatic components and an achromatic component whose combination expresses a gray scale image,
   (h-2) producing chromatic blocks according to said chromatic components of said reference gray image data,
   (h-3) producing an achromatic block according to said achromatic component of said reference gray image data,
   (h-4) printing a first gray image with said chromatic blocks or said achromatic block,
   (h-5) printing a second gray image with said chromatic blocks and said achromatic block,
   (h-6) comparing respective densities of said first and second gray image and defining a relation between said respective densities, and
   (h-7) defining said second additivity failure correction function on the basis of said relation in step (h-6).

9. A method of defining a correction rule which is effective for compensating for an additivity failure caused by mixing of chromatic components and an achromatic component included in color image data, where said additivity failure is attributed to a discrepancy between respective densities of first and second reproduced images obtained from said color image data, wherein the first reproduced image is printed with color inks and the second reproduced image is reproduced by means other than with color inks, said method comprising the steps of:

(a) preparing reference gray image data having chromatic components and an achromatic component, the combination of which defines a gray scale image,
(b) producing chromatic blocks according to said chromatic components of said reference gray image data,
(c) producing an achromatic block according to said achromatic component of said reference gray image data,
(d) printing a first gray image based on said chromatic blocks or said achromatic block,
(e) printing a second gray image based on said chromatic blocks and said achromatic block,
(f) comparing respective densities of said first and second gray images and defining a relation between said respective densities, and
(g) defining said correction rule on the basis of said relation in said step (f).

10. A method for proofing an image prior to the printing thereof, said method comprising:
(a) reading an original image and generating original color image data representative thereof;
(b) generating from said original color image data modified color image data for controlling therewith the printing, with inks, of a reproduction of said original image; and
(c) converting said modified color image data to image proofing data for controlling an image producing device of the type which produces an image without the use of colored inks, said converting being carried out in accordance with a predefined correctional rule;
wherein said correction rule is such that image generated with said image producing device from said image proofing data is colorwise visually identical to an image printed, with colored inks, from said modified color image data, wherein, further, said correction rule is such that it defines and correlates for each of a plurality of primary color mixtures associated with ink base printing a corresponding primary color mixture for a non-ink base printing process such that the use of correlated color mixtures produces visually identical colors in respective images.

11. The method of claim 10, further comprising generating said correction rule, the generation of said correction rule including:
(a) providing reference color image data;
(b) printing a first reproduced image with colors determined according to said reference color image data;
(c) producing a second reproduced image with said reference color image data and by means of a non-ink-based image producing device;
(d) comparing said first and second reproduced images and identifying the difference between the respective colors at different locations in said first and second reproduced images; and
correlating locations in said first and second images which contain similar colors.

* * * * *